Nov. 16, 1948.                J. D. STACY                2,454,102
                          ELECTRIC CAPACITOR
                          Filed Jan. 2, 1948
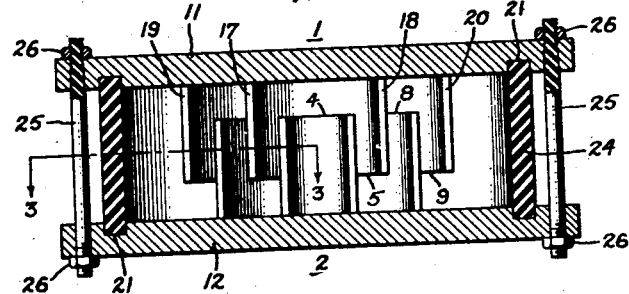
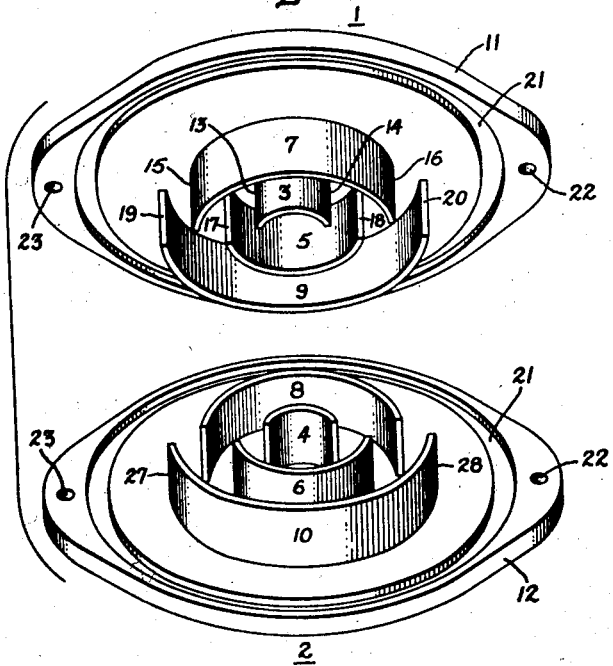
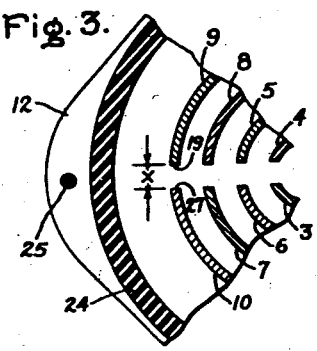
Inventor:
John D. Stacy,
by Ernest H. Britton
His Attorney.

Patented Nov. 16, 1948

2,454,102

UNITED STATES PATENT OFFICE 2,454,102

ELECTRIC CAPACITOR

John D. Stacy, Pittsfield, Mass., assignor to General Electric Company, a corporation of New York Application January 2, 1948, Serial No. 266

10 Claims. (Cl. 175—41)

My invention relates to electric capacitors or condensers and more particularly to a new construction for fixed capacitors which employ gas, air or liquid as the dielectric.

In the manufacture of such capacitors it is necessary to assemble electrodes of considerable area in a spaced relationship with the smallest spacing which can be permitted and still withstand, without failure, a desired test voltage between adjacent electrodes of opposite polarity. It has been found that electrode structures assembled from individual electrode plates with conventional spacers and bolts are subject to considerable variation of spacing throughout the structure due to buckling of the plates. As a result, the designer employs a greater average spacing than is otherwise necessary in a uniformly spaced structure. Obviously, this adds to both the physical volume and cost of the finished capacitor.

It is therefore an object of my invention to provide a capacitor construction with an improved method of maintaining the electrodes or plate members in spaced relation.

It is also an object of my invention to provide a capacitor the electrodes of which are properly spaced without the use of conventional spacers.

It is also an object of my invention to provide a capacitor construction rigid to the extent that the spacing between electrodes or plates is reduced to a minimum notwithstanding the absence of spacers and thereby reduce the physical volume of a capacitor of specific rating and, as a consequence, the manufacturing cost.

It is a further object of my invention to provide a capacitor in which all the electrodes of one polarity consist of a rigid assembled unit identical in every respect to a similar unit comprising the electrodes of opposite polarity.

Another object of my invention is the realization of an exceptionally high and constant accuracy of spacing between electrodes by the cast production of separate and opposed electrode units from the same mold.

In accordance with my invention, I provide two identical electrode units each of which comprises a plurality of electrically interconnected and spaced electrodes of curved configuration projecting a relatively short distance from a common support base and so affixed thereto with respect to each other that the electrodes of one unit may be interleaved with an accurately spaced at close tolerance from the electrodes of the other unit without the employment of conventional spacers, and which together form a complete capacitor having considerable effective plate area because of the resulting compact arrangement of the assembled electrodes of opposing polarity.

My invention will be better understood from the following description when taken in connection with the accompanying drawing and the scope of my invention will be pointed out in the appended claims. In the drawing Fig. 1 is a section taken through the center of an assembled capacitor unit embodying my invention; Fig. 2 is a perspective view of the two primary units or parts of the Fig. 1 capacitor before assembly, and Fig. 3 is a partial sectional view of the assembled capacitor taken on the line 3—3 of Fig. 1.

Referring to Figures 1 and 2 of the drawing, I have illustrated a capacitor comprised essentially of two separate sets of electrically opposed electrodes or units 1 and 2. Unit 1 consists of a plurality of electrically interconnected conducting electrodes or plates 3, 5, 7 and 9 of conducting material projecting normally from a supporting base or plate 11 and unit 2, which is identical in every respect to unit 1, consists of a plurality of electrically interconnected conducting electrodes or plates 4, 6, 8 and 10 projecting from a supporting base or plate 12. Each of the electrodes of a unit comprises separate segments or portions of cylindrical surfaces concentrically arranged about a common axis and having varying radii of curvature differing by equal increments. However, the electrodes of a set or unit are so positioned or affixed to the supporting base that any electrode of a given radius of curvature is opposed to and diametrically opposite the electrode having the next highest and the next lowest radius of curvature. To be more specific, the radius of curvature of electrode 5 of unit 1, for example, is greater than the radius of curvature of opposed electrodes 3 by a given increment and the radii of curvature of opposed electrodes 7 and 9 are respectively greater than the radii of curvature of electrodes 5 and 7 by the same increment. The angular extent, however, of each electrode is less than 180° and varies between electrodes so that, in the particular embodiment of my invention as illustrated, the terminating edges 13 and 14 of electrode 3 and the terminating edges 15 and 16 of electrode 7 are in a common plane parallel thereto or normal to the supporting plate while the terminating edges 17 and 18 of electrode 5 and the terminating edges 19 and 20 of electrode 9 are in another common plane parallel to and spaced a predetermined distance from the first plane. In other words the electrodes of a set are disposed in staggered relationship on opposite sides of a third plane passing through their concentric axis so that only electrodes having a spacing therebetween equal to twice the increment difference between radii of the electrodes, when considered radially in increasing or decreasing order, are adjacently disposed on the same side of the plane and the terminating edges of the electrodes on one side of the plane are at the same distance therefrom as the terminating edges of the electrodes on the opposite side of the plane.

Because of the configuration of each electrode when viewed in plan and the relatively short dimension in the projecting direction it will be obvious that each electrode will be very rigid to the extent that neither spacers between electrodes of the same polarity nor spacers between electrodes of opposite polarity upon assembly will be necessary. However, it should be equally obvious because of the compact and particular disposition of the electrodes with respect to each other, that considerable effective electrode or plate area will nevertheless be presented.

Although electrodes of a unit may be otherwise electrically interconnected and affixed to a supporting base of insulating material in various ways obvious to those familiar with the art, I have illustrated each set of electrodes as cast integral with a supporting plate of conducting material which thus serves as a common terminal as well as a supporting means for the electrodes affixed thereto. In addition, I have shown an annular groove 21 cast or machined in the opposing surfaces of the supporting plates 11 and 12 and a pair of diametrically opposite openings 22 and 23 beyond the groove. When the units are cast, as illustrated, it will be understood that all units may be produced from the same mold or die inasmuch as they are identical and therefore an exceptionally high degree of similarity and constant accuracy of tolerances between units will be attained.

The capacitor is completely enclosed upon assembly by the engagement of these grooves with the open ends of a cylindrical insulating tube 24 having an inner diameter and thickness approximately equal to the inner diameter and width of the grooves. However, it should now be apparent that before this can be done the units must be turned with respect to each other to the relative positions indicated by Fig. 2 so that electrodes of opposite polarity having the same radius of curvature such as 3 and 4, or 5 and 6, will be diametrically opposite each other and openings 22 and 23 in one unit will be aligned respectively with openings 22 and 23 in the other unit. Thereafter, insulating bolts 25 are inserted through these openings and nuts 26 are threaded thereon to maintain the group of electrodes in interleaved and spaced relationship, as illustrated in Fig. 1.

Insulating tube 24 serves not only to enclose the assembled unit in case it is desired to employ a liquid or gas dielectric but also to maintain the free edges of the projecting electrodes of one set or unit a predetermined distance from the supporting base of the other unit. This spacing may or may not be necessary depending upon whether or not the two supporting bases are of conducting or insulating material. Obviously, the radial and circumferential spacing between electrically opposing electrodes is maintained by the bolts 25. In the event that ordinary air is employed as a dielectric and the supporting bases are of conducting material at the same polarity as the electrodes affixed thereto, an insulating tube may be dispensed with and electrically opposing units may be spaced in an axial direction by any number of ways obvious to those familiar with the art.

Inasmuch as each electrode has an angular extent less than 180° by a predetermined amount and because one set or unit is identical to the other unit the terminating edge of an electrode of one unit such as 19 of electrode 9, will be spaced after assembly, a predetermined amount such as the distance X indicated in Fig. 3 from the corresponding opposing edge 27 of electrode 10 having the same radius of curvature as electrode 9. In other words, the electrodes are on opposite sides of a plane passing through the concentric axis of all electrodes and the corresponding edges 19 and 27 are an equal distance therefrom or a distance equal to one-half X. In fact, since such electrodes of opposite polarity having the same radius of curvature are identical, any corresponding points thereon will be at equal distances from such a plane. Since I have chosen various angular extents for the electrodes so that the two terminating edges of unopposed electrodes of a given unit will be in a common plane, the other terminating edges 20 and 28 of electrodes 9 and 10, respectively, will also be spaced a distance equal to one-half X from and on opposite sides of such a plane. Likewise, the terminating edges of electrodes 7 and 8, respectively, 5 and 6, respectively, and 3 and 4, respectively, are on opposite sides of and at equal distances from this plane.

Although the total effective plate area between electrically opposed electrodes would be reduced, it should, however, at this point be understood that the units may be so constructed that physically opposing electrodes of a given set or unit are not diametrically opposite or the terminating edges of the physically unopposed electrodes of a unit may not all be in the same plane. Nevertheless, after assembly of such units, any corresponding point on and the terminating edges of physically opposed electrodes of opposite polarity having the same radius of curvature will be an equal distance from and on the opposite sides of another plane parallel to the edges and passing through the common concentric axis of all the electrodes.

It should, moreover, also be understood that each electrode does not necessarily have to have a constant radius of curvature nor do the electrodes necessarily have to project perpendicularly or normally from a supporting base, as illustrated. For example, an electrode may project from the supporting base or with respect to a plane perpendicular to the common concentric axis of configuration at an angle other than 90° provided the convex surfaces of all the electrodes on the same side of a plane through and parallel to the axis of configuration project at the same angle of Y degrees and the convex surfaces of all those on the opposite side of the plane project at a supplementary angle of 180°—Y. Furthermore, the electrodes may have an elliptical or even a corrugated configuration instead of a circular configuration when viewed in plan.

The only requirements are that the structure of a given unit should be such that all the electrodes thereof shall be spaced; each electrode shall have a curved configuration and an angular extent less than 180°; the surfaces of physically opposing electrodes shall not overlap, and the convex surface of electrodes on one side of a plane through the concentric axis of configuration and the concave surface of electrodes on the opposite side of this plane shall project at the same angle with respect to a plane perpendicular to the concentric axis.

While I have, in accordance with the patent statutes, shown and described a particular embodiment of my invention and further described suggested modifications thereof, other changes and modifications will be obvious to those skilled in the art and I, therefore, aim in the appended claims to cover all such changes and modifications as fall within the true spirit and scope of my invention.

What I claim as new and desire to secure by Letters Patent of the United States is:

1. In a capacitor, a pair of identical electrode units, each of said units comprising a plurality of spaced and electrically interconnected conducting electrodes projecting from a common supporting plate and concentrically disposed about a common axis, said supporting plates spaced a predetermined distance and the electrodes of one unit projecting toward, interleaved with and spaced from the electrodes of the other unit, each of said electrodes comprising a surface of curved configuration having an angular extent of less than 180° and each of the electrodes of one unit located on opposite sides of a plane passing through said common axis from an identical electrode of the other unit so that corresponding sides of said identical electrodes will face each other and corresponding points of said identical electrodes are an equal distance from said plane.

2. In an electric capacitor, an insulating tube, metallic terminals comprising cover plates respectively closing the open ends of said tube, separate sets of conducting electrodes respectively integral with said cover plate and projecting therefrom within said tube in interleaved and spaced relationship, each of said electrodes comprising a segment of a cylindrical surface having an axis normal to said cover plates and each of the electrodes of one set located in diametrically opposed relationship to an identical electrode of the other set with corresponding points of each of said electrodes equidistant from and on opposite sides of a common plane normal to said cover plates and passing between opposed segments of all the electrodes.

3. In an electric capacitor, an insulating tube, metallic terminals comprising cover plates respectively closing the open ends of said tube, separate sets of conducting electrodes respectively projecting perpendicularly from the inner surface of said cover plates in interleaved and spaced relationship, each of said electrodes comprising a portion of a cylindrical surface having a maximum width dimension normal to the cover plates less than the distance between the inner surfaces thereof and each of the electrodes of one set located in diametrically opposed relationship to an identical electrode of the other set with the corresponding terminating edges of said opposed plates on opposite sides of and equally distant from a plane normal to said cover plates.

4. An electrode unit for a capacitor comprising a metallic terminal member, a plurality of concentrically disposed and spaced electrodes having the form of cylindrical segments projecting normally from said terminal member, each of said plates having an angular extent less than 180° by a predetermined amount and certain of said plates being located on one side of and terminating at a predetermined distance from a plane normal to said terminal member and the balance of said electrodes located in staggered relationship to said certain plates on the opposite side of said plane and terminating at said predetermined distance therefrom.

5. An electrode unit for a capacitor comprising a plurality of spaced conducting electrodes integral with and projecting from a common terminal plate, said conducting electrodes comprising portions of rigid cylindrical surfaces concentrically disposed about a common axis, the radii of said electrodes increasing outwardly from said axis and differing by equal increments, each of said electrodes having an angular extent less than 180° and so angularly offset with respect to the other electrodes that electrodes differing in radii only by said increment are disposed on opposite sides of a plane passing through said common axis with their terminating edges a predetermined distance therefrom.

6. An electrode unit for a capacitor comprising a plurality of spaced electrodes of conducting material integral with and projecting from a common terminal plate, said conducting electrodes comprising portions of rigid cylindrical surfaces concentrically disposed about a common axis, the radii of said electrodes increasing outwardly from said axis and differing by equal increments, each of said electrodes having an angular extent less than 180° with their terminating edges parallel and each of said electrodes angularly offset with respect to each other so that only electrodes differing in radii by twice said increment are adjacently disposed on the same side of a plane passing through said common axis with their terminating edges a predetermined distance therefrom.

7. An electrode element for a capacitor comprising a base of electric current conducting material and a plurality of substantially cylindrically shaped electric current conducting plates projecting substantially perpendicularly from one side of said base and concentrically disposed about a common axis perpendicular to said base, each of said plates having an angular extent of less than 180° with their terminating edges parallel to said axis, certain of said plates disposed on one side of a plane through said axis so that their terminating edges are equidistant therefrom and the remainder of the plates being similarly disposed on the other side of said plane.

8. An electrode element for a capacitor comprising a base of electric current conducting material and a plurality of substantially cylindrically shaped electric current conducting plates projecting normally from one side of said base and concentrically disposed about a common axis with the radii of said plates increasing outwardly therefrom and differing by equal increments, each of said plates having an angular extent less than 180° with their terminating edges parallel to said axis and certain of said plates equidistantly disposed on one side of a plane through said axis and the remainder of the plates being similarly disposed on the other side of said plane.

9. An electrode unit for a capacitor comprising a plurality of conducting plates affixed to and projecting normally from a common terminal plate, said conducting plates comprising portions of cylindrical surfaces concentrically disposed about a common axis, the radii of said plates increasing outwardly from said axis and differing by equal increments, each of said plates having an angular extent less than 180° with their terminating edges parallel to said common axis said plates so positioned that plates differing in radii by twice said increment terminate on and a predetermined distance from one side of a plane passing through said axis and the remainder of said plates terminate on and a predetermined distance from the opposite side of said plane.

10. A unitary plate construction for a capacitor comprising a common terminal portion and a plurality of less than 180° segments of concentric cylindrical shaped plates projecting a predetermined amount from one side of said terminal portion, the radii of adjacent plates differing from each other by the same amount and said segments being disposed relative to a predetermined plane which includes the common axis of said plates as an element so that each segment is on the opposite side of said plane relative to the segment having the next larger radius.

JOHN D. STACY.

No references cited.